United States Patent

[11] 3,581,789

| | | |
|---|---|---|
| [72] | Inventor | Aram J. Torosian<br>3350 E. Alta Ave., Fresno, Calif. 93702 |
| [21] | Appl. No. | 792,247 |
| [22] | Filed | Jan. 21, 1969 |
| [45] | Patented | June 1, 1971 |

[54] FRUIT SLICING AND PITTING MACHINE
8 Claims, 7 Drawing Figs.

| | | |
|---|---|---|
| [52] | U.S. Cl. | 146/28 |
| [51] | Int. Cl. | A23n 3/08 |
| [50] | Field of Search | 146/28, 40 |

[56] References Cited
UNITED STATES PATENTS

| | | | |
|---|---|---|---|
| 913,571 | 2/1909 | Smith | 146/28 |
| 1,028,175 | 6/1912 | Allen | 146/28 |
| 1,334,162 | 3/1920 | Moltzner | 146/28 |
| 2,378,101 | 6/1945 | Polk, Sr. et al | 146/28 |
| 2,675,039 | 4/1954 | Bauer | 146/28X |

*Primary Examiner*—Willie G. Abercrombie
*Attorney*—Huebner & Worrel

ABSTRACT: A machine for slicing and pitting fruit, such as peaches and the like, having an edible mesocarp, or flesh, and a substantially central endocarp, or pit. The machine includes a plurality of radially arranged resiliently outwardly movable blades. The peach is fed through the blades which slice the flesh and are engaged by the pit for outward camming movement in response to passage of the pit. A cutting wire or wires are associated with the blades and define a loop in which the tip of the pit is received, the loop being distended with the movement of the blades so that the wires pass adjacent to the pit and separate it from the flesh during the slicing action.

ARAM J. TOROSIAN
INVENTOR

Huebner & Worrel
ATTORNEYS

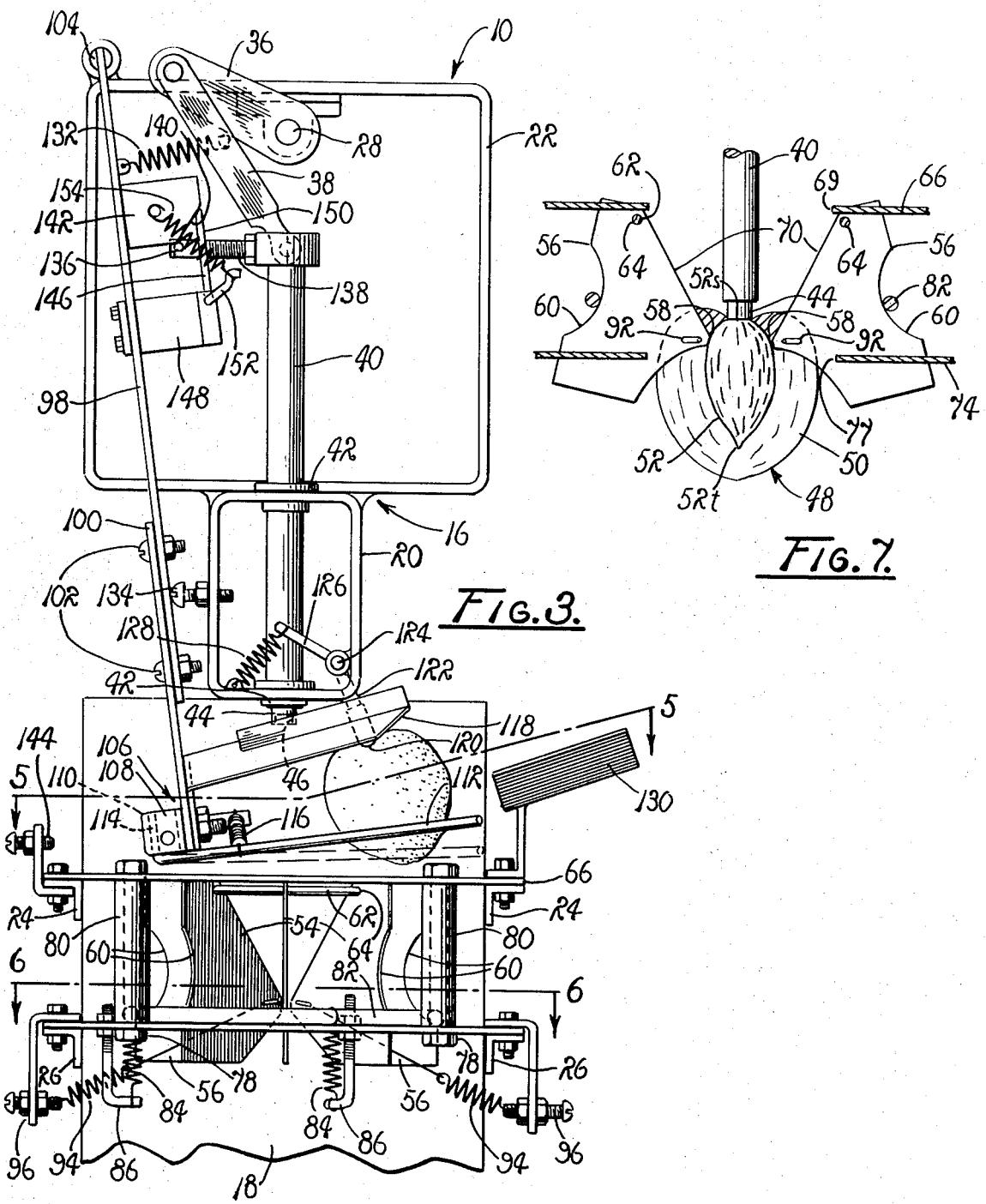

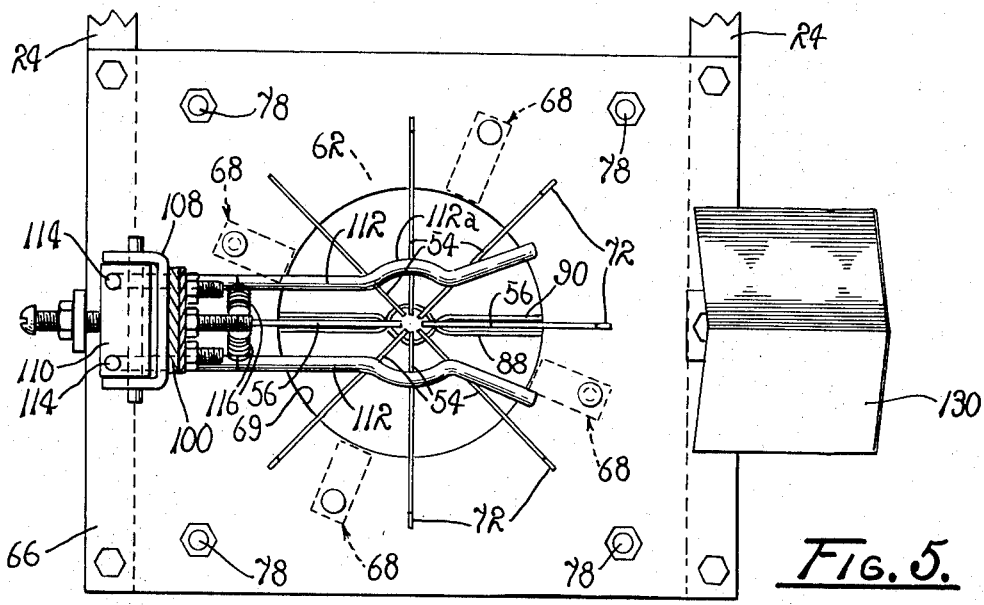

FRUIT SLICING AND PITTING MACHINE

BACKGROUND OF THE INVENTION

The present invention relates to a machine for slicing and pitting fruit, and more particularly to a machine for simultaneously effecting these operations.

Peaches are presently processed for canning or freezing by dividing each peach into halves along the suture line thereof and separating the pit from the peach half to which it adheres. The peach halves are then positioned with the pit recesses or cups downwardly disposed on a belt and moved past a lye solution spray which consumes the epocarp or skin of the peach or renders it readily removable. The peach halves are then rinsed and moved, one by one, past a slicer consisting of a plurality of angularly arranged whirling disc blades. At the slicer, an attendant adjusts the peach halves to prevent crowding and for proper slicing. In addition to requiring a greater number of attendants and/or machines than desired to perform the various steps of the conventional processing, the machines are unable to extract split pits and the spray solution tends to seep past the edges of the skin and consume the flesh of the fruit. This is wasteful of the fruit, sometimes causing a loss of up to 100 pounds per ton. It also impairs the quality of the product. Further, because of the differing of sizes and characteristics of different varieties of peaches and other fruit, it is frequently necessary to have a separate machine for each variety.

SUMMARY OF THE INVENTION

It is therefore an object of the present invention to provide a machine for simultaneously slicing and pitting peaches and the like.

Another object is to provide such a machine which is equally effective with different varieties of peaches and other fruits.

Another object is to provide such a machine which effectively separates split pits, as well as whole pits, from the slices.

Another object is to provide a machine which accepts whole peaches and the like and, in one movement thereof past a set of blades, slices the peach and simultaneously separates the pit therefrom.

Another object is to provide such a machine which is of simple and inexpensive construction and operates in a rapid reliable manner for slicing and pitting fruit.

Another object is to provide a machine for simultaneously slicing and pitting peaches and the like which minimizes the amount of equipment and number of attendants required to process the same.

These and other objects and advantages are achieved by the provision of a machine having a plurality of movable blades radially arranged with respect to a predetermined path of movement of the fruit, which blades are resiliently urged inwardly to slice the fruit but resistively retractible to accommodate passage of the pit, and which blades mount a pair of cutting wires which pass through openings in the blades and define a central loop in which the tip of the pit is received, the loop being distended by movement of the blades in response to passage of the pit and pass adjacent to the pit for separating it from the flesh.

BRIEF DESCRIPTION OF THE DRAWINGS

FIG. 3 is a fragmentary end elevation of the machine.

FIG. 5 is a horizontal sectional view taken on line 5—5 of FIG. 3.

FIG. 6 is a horizontal vertical sectional view taken on line 6—6 of FIG. 3.

FIG. 7 is a fragmentary vertical sectional view illustrating the action of the blades in response to passage of a pit.

DESCRIPTION OF THE PREFERRED EMBODIMENT

Figure 1:
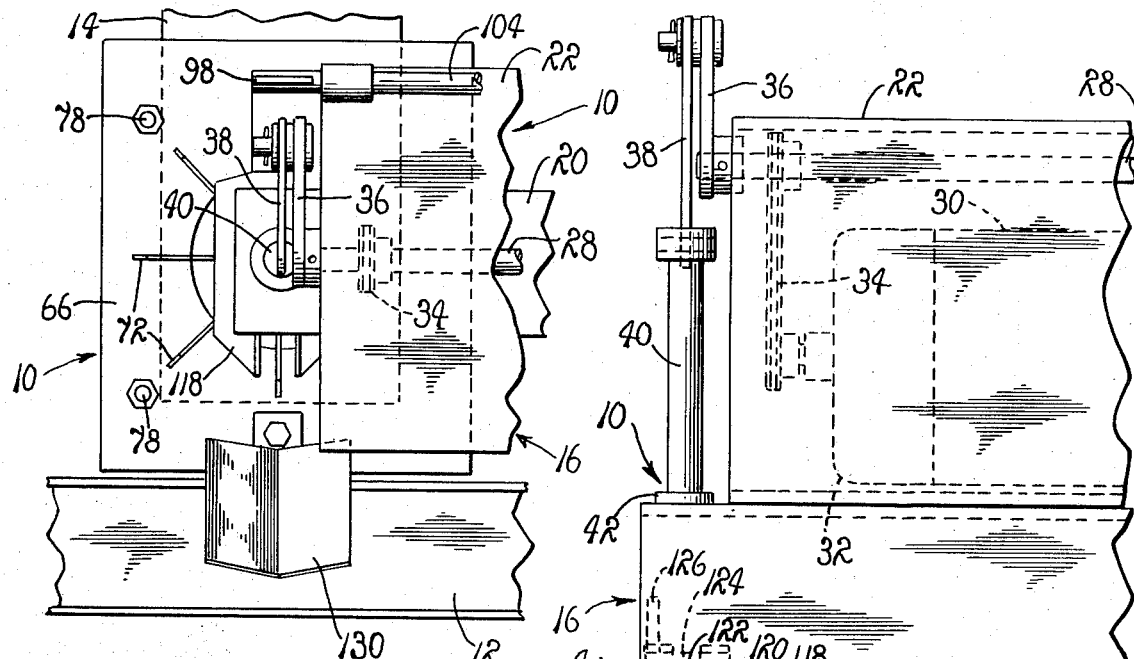
FIG. 1 is a fragmentary plan view of a machine embodying the principles of the present invention.

Referring to the drawings, there is shown in FIG. 1 a fragmentary view of a machine embodying the principles of the present invention and designated generally by reference numeral 10. Associated with the machine is a conveyor 12 adapted to carry fruit for processing to the machine and a conveyor 14 for removing the sliced and pitted fruit for further processing, canning, freezing or the like.

Figure 2:
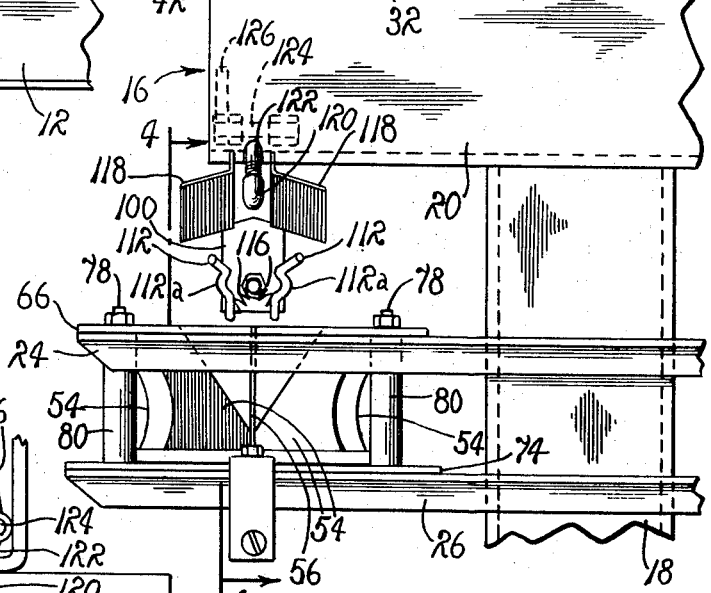
FIG. 2 is a fragmentary front elevational view of the machine.

As best seen in FIGS. 2 and 3, the machine 10 includes a framework 16 made of an upright structural tube 18, horizontal tubes 20 and 22, and pairs of angle iron stringers 24 and 26. Obviously the framework may be of any other suitable form. The tube 18 serves as a columnar support or pedestal to the top of which is secured the tube 20, which in turn supports the tube 22. The tubes 20 and 22 are conveniently substantially square in cross section. The angle irons 24 and 26 are secured to the tube 18 in parallel and vertically spaced relation, as shown in FIG. 3.

Figure 4:
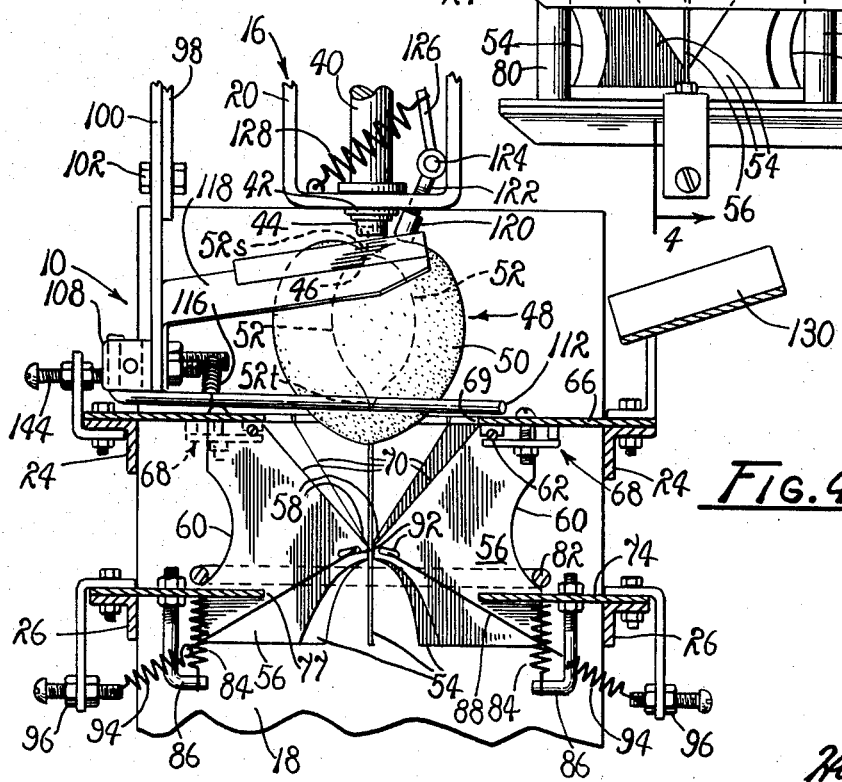
FIG. 4 is a fragmentary sectional view taken generally on line 4—4 of FIG. 2 showing a peach aligned for feeding.

Mounted for rotation on the tube 22 is a shaft 28 adapted to be driven by a motor 30 housed in the tube and connected to the shaft through a reduction gearing 32 and a drive train 34, such as a chain and sprockets, or the like. Connected to the end of the shaft 28 is a crank arm 36 and pivotally connected thereto is one end of a connecting link or pitman 38. The other end of the link is pivotally connected to the upper end of a plunger 40 journaled for vertical reciprocation in bearings 42 mounted on the transverse tube 20. The lower end of the plunger is internally threaded and adjustably received therein is a rod 44, the lower end of which is preferably provided with a recess 46 defining an inverted cuplike socket. As shown in FIG. 4, the socket 46 is adapted to engage a piece of fruit 48, such as a peach or the like having mesocarp 50 in which the pit 52 is substantially centrally located. The pit has a stem end 52s and a tip end 52t adapted to be placed in alignment with the plunger 40. The peach is fed by downward movement of the plunger into engagement with a plurality of blades 54 and 56 radially arranged, as shown in FIG. 5. For subsequent convenience of description, the two identification numerals are utilized to designate the identical blades. As best shown in FIGS. 4 and 6, a pair of diametrically aligned blades are designated 56 while all of the other blades, which incidentally are also diametrically aligned, are designated 54. Each blade is roughly of clipped triangular configuration, as shown in FIG. 7, with an inwardly disposed rounded apex 58 and an outwardly disposed curved surface 60, opposite to the apex. The blades are supported for pivotal movement on the frame by means of a split ring 62 passed through annularly aligned bores 64 provided in the blades and spaced a predetermined distance from their respective apices. The ring 62 is suitably supported on an upper plate 66 by any suitable clamping devices 68. The plate is supported on the angle irons 24 and has an opening 69 concentric with the ring. Each blade has an obliquely upwardly disposed cutting edge 70 between the rounded apex 58 and its bore 64 which is sharpened for effecting a cutting action on the peach. To maintain the radial disposition of the blades during pivotal movement, the plate 66 is provided with radially disposed narrow slots 72 in which the blades are received and guided. The lower portions of the blades are similarly maintained and guided by means of a lower plate 74 supported on the angle irons 26 and having narrow slots 76, as shown in FIG. 6 vertically aligned with the slots 72. The plate 74 has a concentric opening 77 and is connected to the plate 66 by bolts 78 and spacers 80.

Engaged with the curved surfaces 60 is a ring 82 to which are connected a plurality of tension springs 84 passing through suitable openings in the lower plate 74. The springs 84 are individually connected to adjustable anchors 86 for regulating the tension of the springs. The ring 82 is thus biased downwardly and urges the blades inwardly, with a camming action against the curved surfaces 60, to position the apices of the plates into close adjacency, as shown in FIGS. 3, 4 and 5. However, when a peach, or the like, is forced past the blades, the cutting edges 70 thereof first penetrate and slice the lower portion of the peach, whereupon the pit 52 engages the rounded apices 58 and in due course forces the blades apart to the position shown in FIG. 6. This causes the ring 82 to ride up on the curved surfaces 60, thereby elongating the springs 84 and increasing the bias on the blades. After the major portion of the pit 48 has passed the apices 58, as shown in FIG. 7, this increased bias on the blades causes them to effect a downward camming action on the pit for completion of the slicing of the peach and a return of the blades to positions where the apices are in the aforementioned close adjacency. The stroke of the rod 44 is predetermined to terminate just short of contact with the blades when they are disposed in their positions of close adjacency for precluding harm to the blades by the rod in the event that there is no peach in alignment with the plunger.

A significant feature of the present invention resides in the provision of means for separating the pit 52 from the flesh 50 during slicing of the peach. This is accomplished by a pair of cutting wires 88 and 90 passing through openings 92 in the blades adjacent to the apices thereof. As shown in FIG. 5, the wire 88 passes adjacent to a common side of the blades 56, through their openings, and through the openings 92 of the blades 54 opposite to said common side of the blades 56. The wire 90 extends through the openings 92 of the blades 54 at said common side of the blades 56, thence through the openings 92 of the blades 56, crossing the wire 88, and along said opposite sides of the blades 56. The portions of the wires between the openings 92 in the plates 56 define a loop which initially encompasses a very small area in which the tip end of the pit 52 is received, such loop becoming larger with outward movement of the blades to accommodate passage of the pit and simultaneously passing close to the exterior of the pit for separating it from the flesh 50 during slicing of the peach. The distal ends of the wires are connected to tension springs 94, the tension of which is regulated by adjustable anchors 96 suitably supported on the plate 74.

It will be appreciated that the peach 48 can be placed in alignment with the plunger 40 and blades 54 and 56 by any suitable means; manual, mechanical, automatic or operator actuated. However, in the interest of relatively high speed operation of the machine, it is preferred that the peach be automatically indexed and aligned with the plunger and the blades. To this end, the machine is provided with an elongated support 98 to which is adjustably secured an extension 100 by bolts 102. The support 98 is pivotally mounted on the tube 22, as at 104 and depends therefrom.

The extension 100 has secured thereto a peach grasping device 106 which includes a U-shaped bracket 108 on which a support block 110 is mounted for pivotal movement about a generally horizontal transverse axis. Mounted for pivotal movement about generally upright, parallel axes are a pair of grasping fingers 112, each having an upturned end 114 journaled in the block 110. Connected to each finger is a tension spring 116. The springs are obliquely related to each other and secured to the extension 100 so as to urge the grasping fingers toward each other and upwardly. The fingers have distal ends, which diverge, and intermediate arcuate portions 112a, as shown in FIG. 2, adapted to receive and grasp the lower portion of a peach. The upper portion of a peach is grasped by a pair of obliquely related plates 118, also best seen in FIG. 2. The plates 118 are adjustably mounted on the extension 100 so as to be positioned relative to the fingers 112 for frictionally engaging the successive peaches and holding them in proper position.

The proper position of the peach is indicated by a pointer 120 normally disposed between the plates 118 and having a rounded end. The pointer is preferably adjustably connected to a depending rod 122 pivotally supported on the tube 20, as at 124, and having an arm 126. A tension spring 128 interconnects the arm and the tube 20 for resiliently holding the pointer in a predetermined normal position. It is preferred that the peach be positioned in the grasping device with the suture line thereof generally in the plane of the plates 56 and with the pointer 120 in the depression at its stem end. To assist the operator in this regard, a guide chute 130 is provided and suitably supported on the upper plate 66.

Interconnecting the support 98 and the tube 22 is a tension spring 132 which urges the member against an adjustable stop 134 on the tube 20, as shown in FIG. 3. Movement is imparted to the support 98 against the bias of the spring 132 by a cam finger 136 mounted on a threaded rod 138 adjustably secured to the plunger 40 and movable therewith. The cam finger is engageable with a cam surface 140 formed on a bracket 142 fixed to the support 98 so that upward movement of the cam finger causes the grasping device 106 to move to the left, as viewed in FIG. 3, against an adjustable stop 144 mounted on one of the angle irons 24. During such upward movement, the cam finger rides past the upper or distal end of a cam 146 pivotally mounted on a bracket 148 secured to the support 98 and having a control surface 150 engaged by the cam finger during downward movement of the plunger 40. The cam 146 has fixed thereto an arm 152. Interconnecting the arm and the bracket 142 is a tension spring 154 urging the distal end of the pivoted cam 146 against the upper end of the cam surface 140.

OPERATION

The operation of the machine of the present invention is believed to be clearly apparent and is briefly summarized at this point. With the grasping device 106 disposed as shown in FIG. 3, a peach 48 is inserted in the arcuate portions 112a of the fingers 112 with the suture line thereof disposed midway of the fingers and the stem end of the pit 52 directly under the pointer 120, the guide chute 130 being employed to assist in guiding and orienting the peach. Upon upward movement of the plunger 40, the cam finger 136 engages the cam surface 140 and forces the grasping device to the left to the position shown in FIG. 4. In due course, the cam finger rides past the distal end of the pivoted cam 146 causing it to swing slightly to permit passage of the cam finger which then rides off of the cam surface 140 and reaches the limit of its upward movement. On downward movement of the cam finger, it is in engagement with the cam surface 150 and during such engagement maintains the grasping device in the position shown in FIG. 4. In the meantime, the rod 44 engages the stem end 52s of the pit and forces the peach downwardly, causing the spreading of the grasping fingers and passage of the fruit. With the grasping fingers free of the fruit and the cam finger free of the cam surface 150, the spring 132 returns the grasping device to the position shown in FIG. 3, ready for receipt of another peach.

As the peach 48 is thrust downwardly by the plunger 40, the blades 54 and 56 engage the lower portion of the peach and commence a slicing action. Eventually, the tip end 52t of the pit enters the loop defined by the wires 88 and 90 which pass close to the surface of the pit cutting it from the peach slices. With passage of the pit 52, the apices 58 of the blades are engaged thereby for outward swinging movement of the blades. This movement accommodates passage of the pit and enlarges the loop. When the major portion of the pit passes the apices, the bias on the blades causes a downward camming action on the pit for completing slicing of the peach and return of the blades to initial positions.

It will be apparent that an improved machine has been provided for simultaneously slicing and pitting peaches and the like. It is equally effective and automatically accommodates different varieties, kinds, and sizes of fruit to be pitted and sliced. As compared with prior practices, it minimizes the amount of equipment and number of attendants required to pit and slice fruit. It is simple in construction, economical to produce, durable, easily repaired, and fully effective for accomplishing its intended operations.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A machine for slicing and pitting pit-bearing fruit having a central pit encased in a body of flesh comprising:
   A. a frame;
   B. means for serially feeding pit-bearing fruit along a predetermined path;
   C. cutting means including an array of radially extended, and pivotally supported blades of a triangular configuration disposed within said path for slicing said fruit, each of said blades including an apex and a cam surface oppositely disposed from said apex;
   D. biasing means including a resiliently supported ring simultaneously engaging the cam surfaces of the blades of said array continuously urging the blades into a disposition wherein the apices are arranged in close adjacency and are so disposed as to be engaged by pits as the fruit is fed by said feed means and to permit the blades to pivot outwardly in response to passage of an engaged pit; and
   E. separating means operatively associated with the cutting means adapted to pass adjacent to the pits for separating the pits from the flesh of the fruit simultaneously with the slicing thereof.

2. The machine of claim 1 in which the means adapted to pass adjacent to the pit to separate it from the flesh comprises a distendible resiliently contracted loop encompassing the pit during passage thereof.

3. The machine of claim 1 wherein the separating means includes flexible means passing through the blades adjacent to the apices thereof and defining a loop.

4. The machine of claim 1 further comprising means for placing fruit in alignment with the feed means.

5. The machine of claim 4 wherein the feed means includes a reciprocable plunger, and the means for placing the fruit in alignment therewith includes fruit grasping means mounted on the frame for coordinated movement with the plunger.

6. The machine of claim 5 in which the plunger carries a cam, and the grasping means is mounted for swinging movement and has associated therewith cam surfaces engageable by the cam for swinging the grasping means into alignment with the plunger and maintaining such alignment for engagement of the fruit by the plunger.

7. A machine for processing fruit having a pit and pit encasing flesh comprising a frame, fruit slicing means mounted on said frame, including a plurality of radially arranged movable cutters, and separating means including flexible means passing through the cutters and defining a loop variable in size with movement of the cutters to accommodate passage of the pit; and means associated with the slicing means adapted to separate the pit from the flesh during the slicing of the fruit.

8. A slicer and pitter for fruit having a pit and pit encasing flesh comprising means for advancing the fruit successively along a predetermined path; a plurality of substantially flat blades having cutting edges; means mounting the blades concentrically about said path, disposed substantially radially of the path, with the sharpened edges of the blades disposed obliquely in the direction from which fruit is advanced along the path and presenting apices adjacent to the path, and for movement of the blades toward and from the path; resilient means urging the blades inwardly toward the path; and a distendible resiliently contracted wire loop extended through the apices of the blades in circumscribing relation to the path adapted to pass between the pits and their encasing flesh as the fruit is advanced along the path.